(12) United States Patent
Park et al.

(10) Patent No.: US 10,575,011 B2
(45) Date of Patent: Feb. 25, 2020

(54) INTER PREDICTION METHOD AND APPARATUS IN IMAGE CODING SYSTEM

(71) Applicant: LG ELECTRONICS INC., Seoul (KR)

(72) Inventors: Naeri Park, Seoul (KR); Jaehyun Lim, Seoul (KR); Jungdong Seo, Seoul (KR); Junghak Nam, Seoul (KR)

(73) Assignee: LG ELECTRONICS INC., Seoul (KR)

(*) Notice: Subject to any disclaimer, the term of this patent is extended or adjusted under 35 U.S.C. 154(b) by 14 days.

(21) Appl. No.: 15/761,665

(22) PCT Filed: Aug. 25, 2016

(86) PCT No.: PCT/KR2016/009410
§ 371 (c)(1),
(2) Date: Mar. 20, 2018

(87) PCT Pub. No.: WO2017/052081
PCT Pub. Date: Mar. 30, 2017

(65) Prior Publication Data
US 2018/0352247 A1    Dec. 6, 2018

Related U.S. Application Data

(60) Provisional application No. 62/222,790, filed on Sep. 24, 2015.

(51) Int. Cl.
*H04N 7/12*      (2006.01)
*H04N 11/02*     (2006.01)
(Continued)

(52) U.S. Cl.
CPC .................................. *H04N 19/513* (2014.11)

(58) Field of Classification Search
None
See application file for complete search history.

(56) References Cited

U.S. PATENT DOCUMENTS 8,238,433 B2    8/2012  Maciel De Faria et al.
2011/0013697 A1*  1/2011  Choi .................... H04N 19/105
                                          375/240.16
(Continued)

FOREIGN PATENT DOCUMENTS

JP    2015156704 A   8/2015
KR    1020060133943 A  12/2006
(Continued)

OTHER PUBLICATIONS

JCTVC-L1003_V11: Joint Collaborative Team on Video Coding (JCT-VC) of ITU-T SG16 WP3 and ISO/IEC JTC1/SC29/WG11 12th Meeting: Geneva, CH, Jan. 14-23, 2013, High Efficiency Video Coding (HEVC) text specification draft 10 (for FDIS & Consent) Editor, pp. 1-332.

(Continued)

*Primary Examiner* — Chikaodili E Anyikire
(74) *Attorney, Agent, or Firm* — Dentons US LLP

(57) ABSTRACT

An inter prediction method performed by a decoding apparatus according to the present invention comprises the steps of: receiving information associated with an MVD through a bit stream; deriving a candidate motion information list on the basis of a neighboring block of a current block; deriving an MVP of the current block on the basis of the candidate motion information list; deriving a motion vector of the current block on the basis of the MVP and the MVD; and generating a prediction sample with respect to the current block on the basis of the motion vector. According to the present invention, a motion vector may be derived on the basis of a candidate motion information list derived on the basis of a neighboring block. Therefore, the amount of data (Continued)

of prediction mode information can be reduced and inter prediction accuracy and overall coding efficiency can be improved.

11 Claims, 8 Drawing Sheets

(51) Int. Cl.
*H04N 11/04* (2006.01)
*H04N 19/513* (2014.01)

(56) References Cited

U.S. PATENT DOCUMENTS

| | | | | |
|---|---|---|---|---|
| 2013/0101042 A1* | 4/2013 | Sugio | ............ | H04N 19/105 |
| | | | | 375/240.16 |
| 2013/0114717 A1* | 5/2013 | Zheng | ............ | H04N 19/52 |
| | | | | 375/240.14 |
| 2014/0086327 A1* | 3/2014 | Ugur | ............ | H04N 19/52 |
| | | | | 375/240.16 |
| 2014/0153647 A1* | 6/2014 | Nakamura | ............ | H04N 19/52 |
| | | | | 375/240.14 |
| 2014/0219357 A1* | 8/2014 | Chuang | ............ | H04N 19/52 |
| | | | | 375/240.16 |
| 2017/0310990 A1* | 10/2017 | Hsu | ............ | H04N 19/52 |

FOREIGN PATENT DOCUMENTS

| | | |
|---|---|---|
| KR | 1020080064007 A | 7/2008 |
| KR | 1020120079862 A | 7/2012 |
| KR | 1020120140623 A | 12/2012 |
| WO | 2013138631 A1 | 9/2013 |

OTHER PUBLICATIONS

JCTVC-F470: Joint Collaborative Team on Video Coding (JCT-VC) of ITU-T SG16 WP3 and ISO/IEC JTC1/SC29/WG11 6th Meeting: Torino, IT, Jul. 14-22, 2011, "Parsing Robustness for Merge/AMVP," Panasonic Corporation, pp. 1-21.

* cited by examiner

INTER PREDICTION METHOD AND APPARATUS IN IMAGE CODING SYSTEM

CROSS-REFERENCE TO RELATED APPLICATIONS

This application is the National Stage filing under 35 U.S.C. 371 of International Application No. PCT/KR2016/009410, filed on Aug. 25, 2016, which claims the benefit of U.S. Provisional Application No. 62/222,790 filed on Sep. 24, 2015, the contents of which are all hereby incorporated by reference herein in their entirety.

BACKGROUND OF THE INVENTION

Field of the Invention

The present invention relates to an image coding technique, and more specifically, to an inter prediction method and device in an image coding system.

Related Art

Demand for high-resolution, high-quality images such as HD (High Definition) images and UHD (Ultra High Definition) images has been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high resolution and high quality images.

SUMMARY OF THE INVENTION

One object of the present invention is to provide a method and a device for improving image coding efficiency.

Another object of the present invention is to provide a method and a device for improving inter prediction efficiency.

Yet another object of the present invention is to provide a method and a device for efficiently deriving a motion vector based on a modified inter prediction mode.

Yet another object of the present invention is to provide a method and a device for deriving a bi-predicted candidate included in a motion information candidate list for deriving a motion vector.

Yet another object of the present invention is to provide a method and a device for deriving a more accurate motion vector by use of a motion information candidate list derived based on a neighboring block.

In one general aspect of the present invention, there is provided an inter prediction method performed by a decoding apparatus. The method includes: receiving information associated with a motion vector difference (MVD) through a bit stream; deriving a candidate motion information list based on a neighboring block of a current block; deriving a motion vector predictor (MVP) of the current block based on the candidate motion information list; deriving a motion vector of the current block based on the MVP and the MVD; and generating a predicted sample with respect to the current block based on the motion vector.

In another general aspect of the present invention, there is provided a decoding device for performing inter prediction. The decoding device includes: an entropy decoder configured to receive information on a motion vector difference (MVD) through a bit stream; and a predictor configured to derive a motion information candidate list based on a neighboring block of a current block, derive a motion vector predictor (MVP) of the current block based on the motion information candidate list, derive a motion vector of the current block based on the MVP and the MVD, and generate a predicted sample with respect to the current block based on the motion vector.

In yet another general aspect of the present invention, there is provided a video encoding method performed by an encoding device. The method includes: deriving a motion information candidate list based on a neighboring block of a current block; determining a motion vector predictor (MVP) of the current block based on the motion information candidate list; deriving a motion vector of the current block based on the MVP; generating a predicted sample with respect to the current block based on the motion vector of the current block; and encoding prediction mode information indicative of the inter prediction mode and outputting the encoded prediction mode information.

In yet another general aspect of the present invention, there is provided a video encoding device. The encoding device comprises: a predictor configured to derive a motion information candidate list based on a neighboring block of a current block, determine a motion vector predictor (MVP) of the current block based on the motion information candidate list, derive a motion vector of the current block based on the MVP, and generate a predicted sample with respect to the current block based on the motion vector of the current block; and an entropy encoder configured to encode prediction mode information indicative of the inter prediction mode and output the encoded prediction mode information.

According to the present invention, a motion vector may be derived based on a motion candidate list derived based on a neighboring block, thereby reducing an amount of data of prediction mode information indicative of an inter prediction mode and improving overall coding efficiency.

According to the present invention, various methods for deriving a bi-predicted candidate to derive a motion vector are provided, thereby enabling accurate inter prediction and improving overall coding efficiency.

DESCRIPTION OF EXEMPLARY EMBODIMENTS

Figure 1:
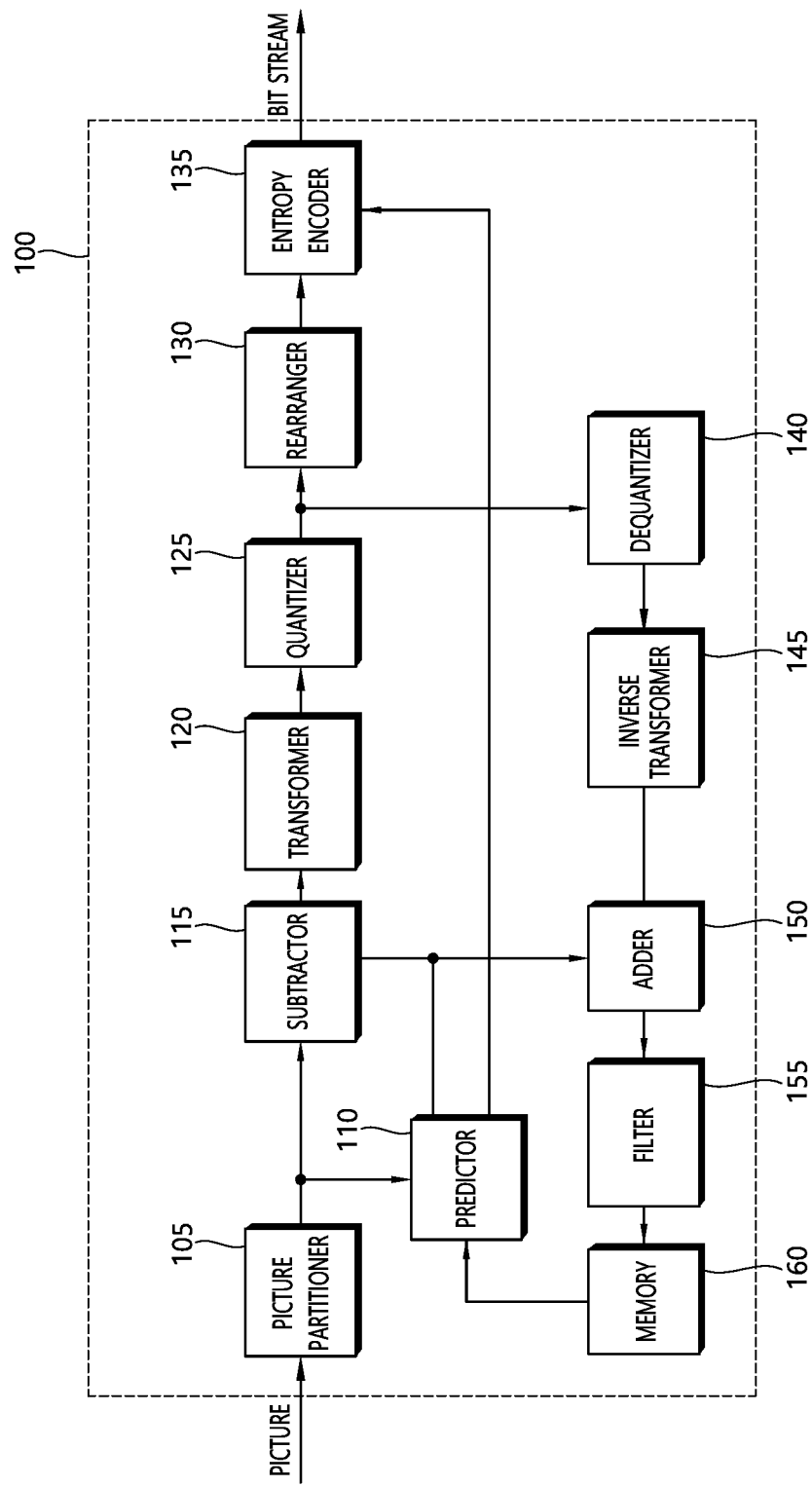
FIG. 1 is a block diagram schematically illustrating a video encoding device according to an embodiment of the invention.

The present invention may be modified in various forms, and specific embodiments thereof will be described and illustrated in the drawings. However, the embodiments are not intended for limiting the invention. The terms used in the following description are used to merely describe specific embodiments, but are not intended to limit the invention. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the invention are independently drawn for the purpose of convenience for explanation of different specific functions in an image encoding/decoding device and does not mean that the elements are embodied by independent hardware or independent software. For example, two or more elements of the elements may be combined to form a single element, or one element may be divided into plural elements. The embodiments in which the elements are combined and/or divided belong to the invention without departing from the concept of the invention.

Hereinafter, exemplary embodiments of the invention will be described in detail with reference to the accompanying drawings.

FIG. 1 is a block diagram schematically illustrating a video encoding device according to an embodiment of the invention.

Referring to FIG. 1, a video encoding device 100 includes a picture partitioner 105, a predictor 110, a transformer 120, a quantizer 125, a rearranger 130, an entropy encoder 135, a dequantizer 140, an inverse transformer 145, a filter 155, and memory 160.

The picture partitioner 105 may be configured to split the input picture into at least one processing unit block. In this connection, a block as a processing unit may be a prediction unit PU, a transform unit TU, or a coding unit CU. The picture may be composed of a plurality of coding tree unit CTUs. Each CTU may be split into CUs as a quad tree structure. The CU may be split into CUs having a deeper depth as a quad-tree structures. The PU and TU may be obtained from the CU. For example, the PU may be partitioned from a CU into a symmetric or asymmetric square structure. Further, the TU may be split into a quad tree structure from the CU.

The predictor 110 includes an inter-prediction unit that performs an inter-prediction process and an intra prediction unit that performs an intra prediction process, as will be described later. The predictor 110 performs a prediction process on the processing units of a picture divided by the picture partitioner 105 to create a prediction block including a predicted sample or a predicted sample array. In the predictor 110, the processing unit of a picture may be a CU, a TU, or a PU. The predictor 110 may determine whether the prediction performed on the corresponding processing unit is an inter-prediction or an intra prediction, and may determine specific details for example, a prediction mode of the prediction methods. The processing unit subjected to the prediction process may be different from the processing unit of which the prediction method and the specific details are determined. For example, the prediction method and the prediction mode may be determined in the units of PU and the prediction process may be performed in the units of TU.

In the inter-prediction, a prediction process may be performed on the basis of information on at least one of a previous picture and/or a subsequent picture of a current picture to create a prediction block. In the intra prediction, a prediction process may be performed on the basis of pixel information of a current picture to create a prediction block.

As an inter-prediction method, a skip mode, a merge mode, and Advanced Motion Vector Prediction (AMVP) may be used. In inter-prediction, a reference picture may be selected for the PU and a reference block corresponding to the PU may be selected. The reference block may be selected on an integer pixel (or sample) or fractional pixel (or sample) basis. Then, a prediction block is generated in which the residual signal with respect to the PU is minimized and the motion vector magnitude is also minimized.

A prediction block may be generated as an integer pixel unit, or as a fractional pixel unit such as a ½ pixel unit or a ¼ pixel unit. In this connection, a motion vector may also be expressed as a fractional pixel unit.

Information such as the index of the reference picture selected via the inter-prediction, the motion vector difference MVD, the motion vector predictor MVP, residual signal, etc., may be entropy encoded and then transmitted to the decoding device. When the skip mode is applied, the prediction block may be used as a reconstruction block, so that the residual may not be generated, transformed, quantized, or transmitted.

When the intra prediction is performed, the prediction mode may be determined in the unit of PU and the prediction process may be performed in the unit of PU. Alternatively, the prediction mode may be determined in the unit of PU and the inter-prediction may be performed in the unit of TU.

The prediction modes in the intra prediction may include 33 directional prediction modes and at least two non-directional modes, as an example. The non-directional modes may include a DC prediction mode and a planar mode.

In the intra prediction, a prediction block may be configured after a filter is applied to a reference sample. At this time, it may be determined whether a filter should be applied to a reference sample depending on the intra prediction mode and/or the size of a current block.

Residual values (a residual block or a residual signal) between the constructed prediction block and the original block are input to the transformer 120. The prediction mode information, the motion vector information, and the like used for the prediction are encoded along with the residual values by the entropy encoder 135 and are transmitted to the decoding device.

The transformer 120 performs a transform process on the residual block in the unit of TUs and generates transform coefficients.

A transform block is a rectangular block of samples and is a block to which the same transform is applied. The transform block may be a TU and may have a quad-tree structure.

The transformer 120 may perform a transform process depending on the prediction mode applied to a residual block and the size of the block.

For example, when intra prediction is applied to a residual block and the residual block has an 4×4 array, the residual block is transformed using discrete sine transform DST. Otherwise, the residual block may be transformed using discrete cosine transform DCT.

The transformer 120 may construct a transform block of transform coefficients through the transform.

The quantizer 125 may quantize the residual values, that is, transform coefficients, transformed by the transformer 120 and may create quantization coefficients. The values calculated by the quantizer 125 may be supplied to the dequantizer 140 and the rearranger 130.

The rearranger 130 may rearrange the transform coefficients supplied from the quantizer 125. By rearranging the quantization coefficients, it is possible to enhance the encoding efficiency in the entropy encoder 135.

The rearranger 130 may rearrange the quantized transform coefficients in the form of a two-dimensional block to the form of a one-dimensional vector through the use of a coefficient scanning method.

The entropy encoder 135 may be configured to entropy code the symbol according to a probability distribution based on the quantized transform values rearranged by the rearranger 130 or the encoding parameter value calculated during the encoding process, etc. and then to output a bit stream. The entropy encoding method is a method of receiving a symbol having various values and expressing the symbol as a binary string that may be decoded while removing statistical redundancy thereof.

In this connection, the symbol means the to-be encoded/decoded syntax element, coding parameter, residual signal value and so on. The encoding parameter is required for encoding and decoding. The encoding parameter may contain information that may be inferred during encoding or decoding, as well as information encoded in an encoding device and passed to a decoding device like the syntax element. The encoding parameter is the information needed to encode or decode the image. The encoding parameter may include statistics or values such as for example, the intra/inter-prediction mode, movement/motion vector, reference picture index, coding block pattern, residual signal presence or absence, transform coefficient, quantized transform coefficient, quantization parameter, block size, block partitioning information, etc. Further, the residual signal may mean a difference between an original signal and a prediction signal. Further, the difference between the original signal and the prediction signal may be transformed to define the residual signal, or the difference between the original signal and the prediction signal may be transformed and quantized to define the residual signal. The residual signal may be called the residual block in the block unit, and may be called the residual samples in the sample unit.

When the entropy encoding is applied, the symbols may be expressed so that a small number of bits are allocated to a symbol having a high probability of occurrence, and a large number of bits are allocated to a symbol having a low probability of occurrence. This may reduce the size of the bit string for the to-be-encoded symbols. Therefore, the compression performance of image encoding may be increased via the entropy encoding.

Encoding schemes such as exponential Golomb, Context-Adaptive Variable Length Coding (CAVLC), and Context-Adaptive Binary Arithmetic Coding (CABAC) may be used for the entropy encoding. For example, the entropy encoder 135 may store therein a table for performing entropy encoding, such as a variable length coding/code (VLC) table. The entropy encoder 135 may perform entropy encoding using the stored VLC table. Further, the entropy encoder 135 derives a binarization method of a corresponding symbol and a probability model of a corresponding symbol/bin, and then performs entropy encoding using the derived binarization method or probability model.

The entropy encoder 135 may give a predetermined change to a parameter set or syntaxes to be transmitted, if necessary.

The dequantizer 140 dequantizes the values transform coefficients quantized by the quantizer 125. The inverse transformer 145 inversely transforms the values dequantized by the dequantizer 140.

The residual value or residual samples or residual samples array generated by the dequantizer 140 and the inverse transformer 145, and the prediction block predicted by the predictor 110 may be combined to form a reconstructed block including a reconstructed sample or a reconstructed sample array.

In FIG. 1, a residual block and a prediction block are added to create a reconstructed block by an adder. At this time, the adder may be considered as a particular unit reconstructed block creating unit that generates a reconstructed block.

The filter 155 applies a deblocking filter, an ALF Adaptive Loop Filter, an SAO Sample Adaptive Offset to the reconstructed picture.

The deblocking filter removes a block distortion generated at the boundary between blocks in the reconstructed picture. The ALF performs a filtering process on the basis of the result values of the comparison of the original picture with the reconstructed picture of which the blocks are filtered by the deblocking filter. The ALF may be applied only when high efficiency is necessary. The SAO reconstructs offset differences between the residual blocks having the deblocking filter applied thereto and the original picture and is applied in the form of a band offset, an edge offset, or the like.

Meanwhile, the filter unit 155 may not apply filtering to a reconstruction block which is used for inter prediction.

The memory 160 may store the reconstructed block or picture calculated by the filter 155. The reconstructed block or picture stored in the memory 160 may be supplied to the predictor 110 that performs the inter-prediction.

Figure 2:
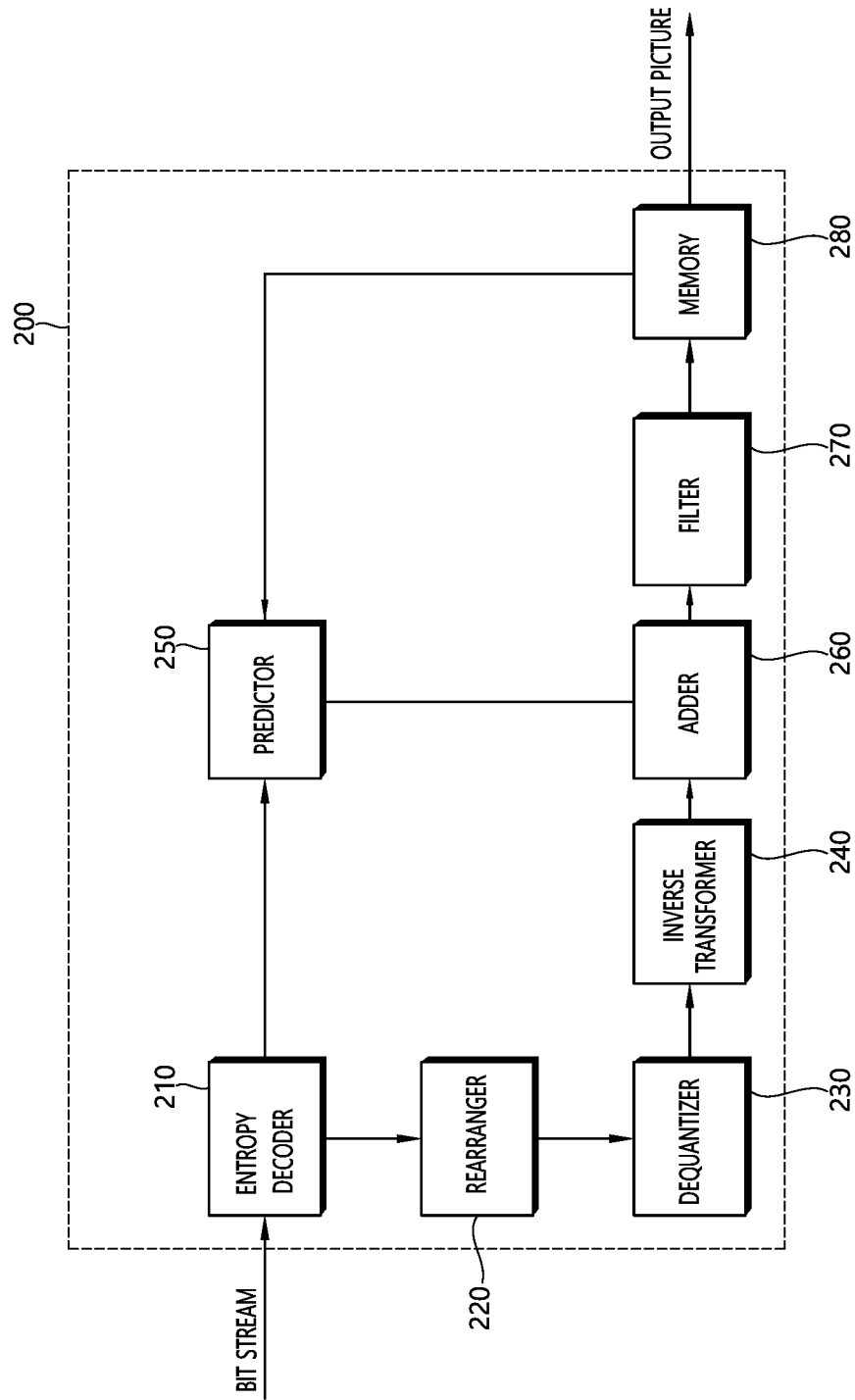
FIG. 2 is a block diagram schematically illustrating a video decoding device according to an embodiment of the invention.

FIG. 2 is a block diagram schematically illustrating a video decoding device according to an embodiment of the invention. Referring to FIG. 2, a video decoding device 200 may include an entropy decoder 210, a rearranger 215, a dequantizer 220, an inverse transformer 225, a predictor 230, a filter 235, and memory 240.

When a video bit stream is input from the video encoding device, the input bit stream may be decoded on the basis of the order in which video information is processed by the video encoding device.

The entropy decoder 210 may entropy-decode the input bit stream according to a probability distribution to generate symbols in a quantized coefficient form. The entropy decoding method is a method of receiving a sequence of binary numbers and generating each of the symbols using the sequence. The entropy decoding method is similar to the entropy encoding method described above.

For example, when a Variable Length Coding VLC (hereinafter referred to as 'VLC') such as CAVLC is used to perform entropy encoding in a video encoding device, the entropy decoder 210 may perform decoding using the same VLC table as the encoding device used in the encoding device. Further, when CABAC is used to perform entropy encoding in a video encoding device, the entropy decoder 210 may perform the entropy decoding using CABAC.

More specifically, the CABAC entropy decoding method may include receiving a bin corresponding to each syntax element in a bit stream, determining a context model using to-be-decoded syntax element information, decoding information of a neighboring block and a to-be-decoded block, or information of a symbol/bin decoded in a previous step, and predicting a probability of occurrence of a bin according to the determined context model and thus performing arithmetic decoding of the bin to generate a symbol corresponding to a value of each syntax element. In this connection, after determining the context model, the CABAC entropy decoding method may further include a step of updating the context model using the information of the decoded symbol/bin to determine a context model of the next symbol/bin.

Information for constructing a predicted block out of the information decoded by the entropy decoder 210 may be supplied to the predictor 230, and the residual values, that is, the quantized transform coefficients, entropy-decoded by the entropy decoder 210 may be input to the rearranger 215.

The rearranger 215 may rearrange the bit stream information, that is, the quantized transform coefficients, entropy-decoded by the entropy decoder 210 on the basis of the rearrangement method in the video encoding device.

The rearranger 215 may reconstruct and rearrange the coefficients expressed in the form of a one-dimensional vector into coefficients in the form of a two-dimensional block. The rearranger 215 may scan the coefficients on the basis of the prediction mode applied to the current block transform block and the size of the transform block and may create an array of coefficients quantized transform coefficients in the form of a two-dimensional block.

The dequantizer 220 may perform dequantization on the basis of the quantization parameters supplied from the video encoding device and the coefficient values of the rearranged block.

The inverse transformer 225 may perform the inverse DCT and/or inverse DST of the DCT and/or DST, which has been performed by the transformer of the video encoding device, on the quantization result from the video encoding device.

The inverse transform may be performed on the basis of a transfer unit or a partition unit of a picture determined by the video encoding device. The transformer of the video encoding device may selectively perform the DCT and/or DST depending on plural information pieces such as the prediction method, the size of a current block, and the prediction direction, and the inverse transformer 225 of the video decoding device may perform the inverse transform on the basis of the transform information on the transform performed by the transformer of the video encoding device.

The predictor 230 generates a prediction block including a predicted sample or a predicted sample array based on the prediction block generation-related information provided by the entropy decoder 210 and the previously decoded block and/or picture information provided from the memory 240.

If the prediction mode for the current PU is the intra prediction mode, the predictor 230 may perform the intra prediction to generate a prediction block based on pixel information in the current picture.

If the prediction mode for the current PU is the inter-prediction mode, the predictor 230 may be configured to perform inter-prediction on a current PU based on information included in at least one picture of a previous picture or a subsequent picture to the current picture. In this connection, information about the motion information necessary for inter-prediction of the current PU provided in the video encoding device, such as motion vector and reference picture index may be deduced via checking the skip flag and merge flag received from the encoding device.

The predictor 230 may generate a prediction block such that the residual signal relative to the current block is minimized and the motion vector size is minimized when inter-prediction is performed on the current picture.

On the other hand, the motion information derivation method may be changed according to the prediction mode of the current block. The prediction mode applied to inter-prediction may include an Advanced Motion Vector Prediction (AMVP) mode, a merge mode, and the like.

For example, when a merge mode is applied, the encoding device and the decoding device may generate a merge candidate list using the motion vector of the reconstructed spatial neighboring block and/or the motion vector corresponding to the Col block which is a temporally neighboring block. In the merge mode, the motion vector of the candidate block selected in the merge candidate list is used as the motion vector of the current block. The encoding device may transmit a merge index indicating a candidate block having an optimal motion vector selected from the candidate blocks included in the merge candidate list to the decoding device. In this case, the decoding device may derive the motion vector of the current block using the merge index.

In another example, when the AMVP (Advanced Motion Vector Prediction) mode is applied, the encoding device and decoding device generate a motion vector predictor candidate list using a motion vector of a reconstructed spatial neighboring block and/or a motion vector corresponding to a Col block as a temporal neighboring block. That is, the motion vector of the reconstructed spatial neighboring block and/or the motion vector corresponding to the Col block as a temporal neighboring block may be used as a motion vector candidate. The encoding device may transmit to the decoding device a prediction motion vector index indicating the optimal motion vector selected from among the motion vector candidates included in the motion vector predictor candidate list. In this connection, the decoding device may select the prediction motion vector for the current block from the motion vector candidates included in the motion vector candidate list using the motion vector index.

The encoding device may obtain the motion vector difference MVD between the motion vector for the current block and the motion vector predictor (MVP), encode the MVD, and transmit the encoded MVD to the decoding device. That is, the MVD may be a value obtained by subtracting the motion vector predictor (MVP) from the motion vector (MV) for the current block. In this connection, the decoding device may decode the received motion vector difference, and derive the motion vector for the current block via addition between the decoded motion vector difference and the motion vector predictor.

Further, the encoding device may transmit a reference picture index indicating a reference picture to the decoding device.

The decoding device may predict the motion vector of the current block using the motion information of the neighboring block and derive the motion vector of the current block using the residual received from the encoding device. The decoding device may generate predicted block for the current block based on the derived motion vector and the reference picture index information received from the encoding device.

In another example, when the merge mode is applied, the encoding device and the decoding device may generate a merge candidate list using motion information of a reconstructed neighboring block and/or motion information of a Col block. That is, when there are motion information of a reconstructed neighboring block and/or motion information of a Col block, the encoding device and the decoding device may use such information as a merge candidate for the current block.

The encoding device may select a merge candidate capable of providing the optimum encoding efficiency among merge candidates included in the merge candidate list as motion information of the current block. In this case, a merge index indicating the selected merge candidate may be included in a bit stream and transmitted to the decoding device. The decoding device may select one of merge candidates included in the merge candidate list by use of the transmitted merge index, and determine the selected merge candidate as motion information of the current block. Thus, when the merge mode is applied, motion information corresponding to the reconstructed neighboring block and/or the Col block may be used intact as motion information of the current block. The decoding device may reconstruct the current block by adding a prediction block and a residual transmitted from the encoding device.

In the above-described AMVP and merge modes, motion information of the reconstructed neighboring block and/or motion information of the Col block may be used to derive motion information of the current block.

In the skip mode, which is one of the other modes used for inter-picture prediction, neighboring block information may be used for the current block as it is. Therefore, in the case of skip mode, the encoding device does not transmit syntax information such as the residual to the decoding device in addition to information indicating which blocks motion information to use as the motion information for the current block.

By performing motion compensation on the current block based on the derived motion information, the encoding device and the decoding device may generate a prediction block for the current block. The prediction block may indicate a motion-compensated block which is generated as a result of motion compensation of the current block. In addition, a plurality of motion-compensated blocks may form a single motion-compensated image.

The reconstructed block may be generated using the prediction block generated by the predictor 230 and the residual block provided by the inverse-transformer 225. FIG. 2 illustrates that using the adder, the prediction block and the residual block are combined to generate the reconstructed block. In this connection, the adder may be viewed as a separate element (a reconstructed block generator) that is configured to generate the reconstructed block. In this connection, the reconstructed block includes a reconstructed samples or a reconstructed samples array as described above; the prediction block includes a predicted sample or a predicted sample array; the residual block may include a residual samples or a residual samples array. Therefore, the reconstructed samples or the reconstructed samples array may be considered to be generated by combining the corresponding predicted sample or predicted sample array with the corresponding residual samples or residual samples array.

When the skip mode is used for a block, the residual signal may not be transmitted and the predicted block may be used as a reconstructed block.

The reconstructed block and/or picture may be supplied to the filter 235. The filter 235 may perform a deblocking filtering operation, an SAO operation, and/or an ALF operation on the reconstructed block and/or picture.

The memory 240 may store the reconstructed picture or block for use as a reference picture or a reference block and may supply the reconstructed picture to an output unit.

The elements that is directly related to decoding images among the entropy decoder 210, the rearranger 215, the dequantizer 220, the inverse transformer 225, the predictor 230, the filter 235 and the memory 240 which are included in the decoding device 200, for example, the entropy decoder 210, the rearranger 215, the dequantizer 220, the inverse transformer 225, the predictor 230, the filter 235, and so on may be expressed as a decoder or a decoding module that is distinguished from other elements.

In addition, the decoding device 200 may further include a parsor not illustrated in the drawing that parses information related to the encoded images included in a bit stream. The parsor may include the entropy decoder 210, and may be included in the entropy decoder 210. Such a parsor may also be implemented as an element of the decoding module.

As described above, a method of deriving a motion vector of the current block which is encoded in the inter prediction mode may be classified into a mode in which a motion vector of a block neighboring the current block is used, and a mode in which a motion vector of the current block is derived more accurately by receiving additional information (ex. MVD) on the motion vector of the current block. Specifically, the method of deriving a motion vector of the current block may be a merge mode, an AMVP mode, etc. In the merge mode, additional information on the inter prediction mode is reduced compared with the AMVP mode, but, in this case, prediction performance may be degraded and therefore an amount of data of a residual sample may be increased. Meanwhile, in the case of AMVP mode, more accurate motion prediction is performed compared with the merge mode to thereby increase prediction performance: however, additional information needs to be transmitted compared with the merge mode.

The present invention proposes a modified inter prediction mode in which additional information is used while inter prediction performance improves. If the modified inter prediction mode is applied, an amount of data of the additional information may be reduced compared with the AMVP mode, and more accurate prediction may be performed compared with the merge mode to thereby reduce an amount of data of a residual sample. As a result, overall coding efficiency may improve.

The present invention provides a method of inducing motion information of neighboring blocks of the current block and deriving a motion information candidate list for a modified inter prediction mode based on the motion information, and a method of deriving a motion vector of the current block based on the motion information candidate list.

Figure 3:
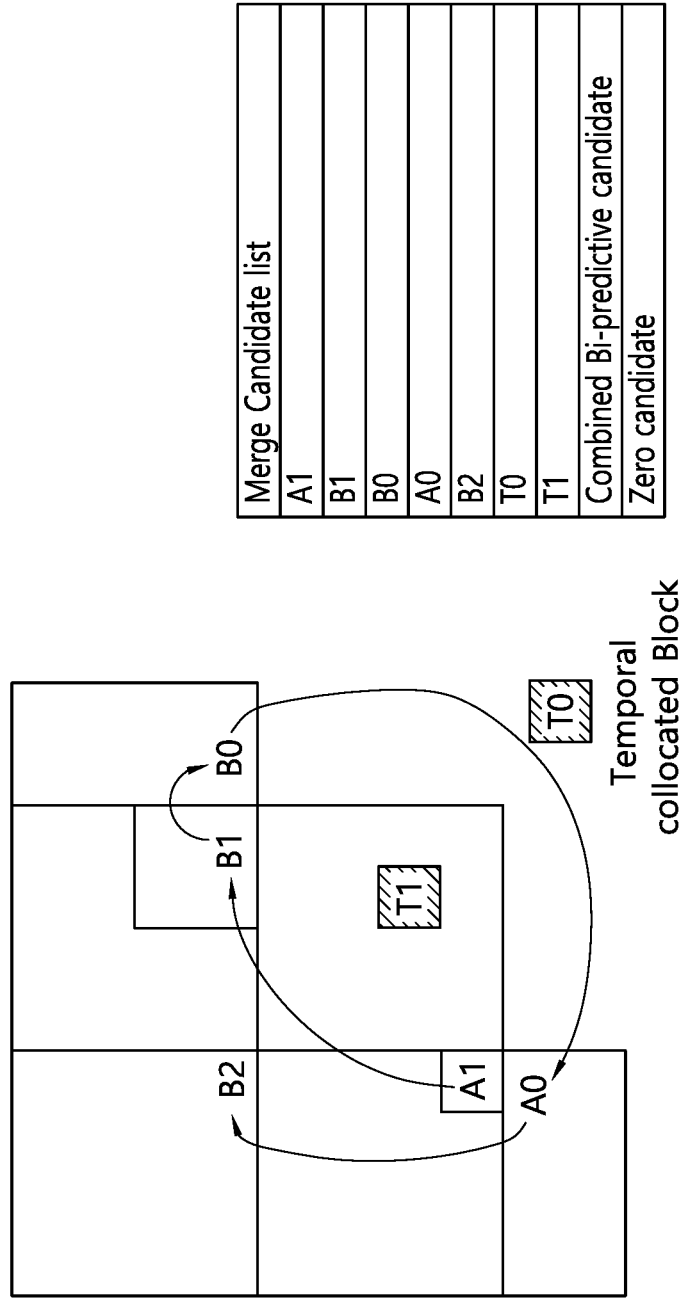
FIG. 3 shows an example of configuring a motion vector predictor (MVP) candidate list of a merge mode.

FIG. 3 shows an example of configuring a candidate list for deriving motion information in a merge mode. Referring to FIG. 3, a candidate list for deriving motion information of the current block may be derived based on neighboring blocks of the current block. Using at least one candidate from among candidates derived based on the neighboring blocks, a motion information candidate list for the modified inter prediction mode according to the present invention may be derived. The candidate list in the merge mode may be composed of motion information of a spatial neighboring block of the current block, may be composed of motion information of a temporal neighboring block, such as T0 or T1 shown in FIG. 3, of the current block, or may be composed by combining motion information of the above neighboring blocks or including a zero vector. The motion information of the neighboring blocks may be derived as temporary candidates for configuring a motion information candidate list of the current block. The temporary candidates may be bi-predicted candidates or L0 or L1 prediction motion vector candidates. The L0 or L1 prediction motion vector candidates may be uni-predicted candidates. The bi-predicted candidates each may include a L0 motion vector and a L1 motion vector, and the uni-predicted candidates each may include one of the L0 motion vector and the L1 motion vector. The L1 motion vector indicates a motion vector for L1 prediction. L0 indicates a reference picture list L0 (list 0), and L1 indicates a reference picture list L1 (list 1). Specifically, when the motion information of a neighboring block is bi-predicted information, the motion information may include a L0 reference picture index, a motion vector associated with the L0 reference picture, a L1 reference picture index, and a motion vector associated with the L1 reference picture. The bi-predicted information of the neighboring block may be derived as a (bi-predicted) candidate for the current block.

When the motion information of the neighboring block is uni-predicted information, the motion information may include a L0 reference picture index and a motion vector associated with the L0 reference picture, or a L1 reference picture index and a motion vector associated with the L1 reference picture. In this case, the L0 reference picture indicates a specific reference picture among reference pictures included in the reference picture list L0. In this case, the specific reference picture may be a reference picture that indicates a reference picture index (L0 reference picture index) associated with the L0 motion vector among reference pictures included in the reference picture list L0. Meanwhile, the L1 reference picture indicates a specific reference picture among reference pictures included in the picture list L1. In this case, the specific reference picture may be a reference picture that indicates a reference picture index (L1 reference picture index) associated with a L1 motion vector among reference pictures included in the reference picture list L1.

The candidate list in the merge mode reuses the same motion information of a neighboring block, unlike in the AMVP mode, so uni-predicted/bi-predicted information and a reference picture index of the corresponding neighboring block are fixed and used for the current block, and therefore, it may be difficult to derive the optimal motion vector (MV) or a motion vector predictor (MVP) with respect to the current block. In the present invention, uni-predicted candidates among the temporary candidates may be induced as bi-predicted candidates, and the bi-predicted candidates corresponding to the uni-predicted candidates may be derived by adjusting a reference picture index of the uni-predicted candidates. Using a motion information candidate list of the modified inter prediction mode, which includes the corresponding bi-predicted candidates, a MV or an MVP more suitable for the current block may be obtained.

Temporary candidates (a temporary candidate list) derived based on the neighboring blocks may be presented as in Table 1, as below.

TABLE 1

|  | pred_idc | refIdx(L0) | refIdx(L1) |
|---|---|---|---|
| A1 | Bi | 0 | 1 |
| B1 | Uni | 0 | — |
| B0 | Uni | 1 | — |
| A0 | Bi | 0 | 0 |
| T0 | Uni | 1 | — |

In this case, A1, B2, B0, A0 and T0 indicate spatial or temporal neighboring blocks of the current block. Pred_idc indicates a uni-predicted/bi-predicted type, refIdx(L0) indicates a L0 reference picture index, and refIdx(L1) indicates a L1 reference picture index. When the temporary candidates are shown as in Table 1, bi-predicted candidates corresponding to uni-predicted candidates B1, B0, and T0 may be derived.

For example, a L1 reference picture index and/or a L1 motion vector may be induced based on a L0 picture index and/or a L0 motion vector of B1 which is a uni-predicted candidate.

Specifically, for example, the L1 reference picture index may be set or fixed to 0.

In another example, the L1 reference picture index may be derived as a L1 reference picture index having the same POCDiff, that is, a picture of count (POC) difference, of the L0 reference picture index of B1. In other words, a reference picture which is included in the reference picture list L1 having a POC difference identical to a difference between a POC of a reference picture associated with the L0 motion vector and a POC of the current picture among reference pictures included in the reference picture list L0 may be derived as the L1 reference picture index. For example, a POC of the current picture is 10 and reference pictures having POCs of 9, 7, and 6 are included in the reference picture list in the descending order, and, in this case, the L0 reference picture index 0 may indicate the reference picture having a POC of 8. If reference pictures having POCs of 11, 12, and 13 are included in the reference picture list L1 in the ascending order, the reference picture having a POC of 12 with POCDiff 2 may be determined to be the L1 reference picture according to the above example, and, in this case, the L1 reference picture index may be set to 1.

In yet another example, the L1 reference picture index may be derived as a value identical to the minimum value among values of the L1 reference picture indexes included in the temporary candidates. Alternatively, the L1 reference picture index may be derived as the most probable value among values of L1 reference picture indexes included in the temporary candidates.

Meanwhile, the L1 (or L0) motion vector may be derived by scaling the L0 (or L1) motion vector included in a uni-predicted candidate. Hereinafter, a method of obtaining the L1 motion vector when the L0 motion vector is included in the uni-predicted candidate will be exemplarily described, and, a method of obtaining the L0 motion vector when the L1 motion vector is included in the uni-predicted candidate will be described in a similar manner by changing only L0 and L1.

Figure 4:
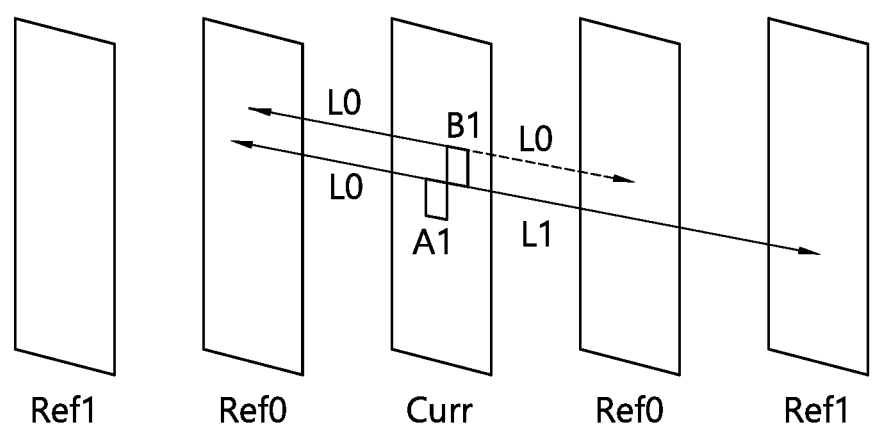
FIG. 4 shows an example of deriving a L1 motion vector.

FIG. 4 shows an example of deriving a L1 motion vector. Referring to FIG. 4, it is assumed that an object included in the current candidate block, for example, B1, is moving with the same gradient, and, in this case, a L0 motion vector may be scaled in a L1 direction. That is, the L1 motion vector may be derived by applying an equation to the L0 motion vector. The L1 motion vector may be derived based on an equation as below:

$$MV(L1)=-MV(L0) \quad \text{[Equation 1]}$$

where MV(L1) denotes the L1 motion vector, and MV(L0) denotes the L0 motion vector.

Meanwhile, when a POCDiff regarding the L0 reference picture and a POCDiff regarding the L1 reference picture are different, the L1 motion vector may be scaled proportionally to a distance ratio, that is, a POCDiff, of a reference picture. For example, when a POCDiff between the current picture and the L0 reference picture is 1 and a POCDiff between the L1 reference picture and the current picture is 2, the L1 motion vector may be scaled to be twice greater than the L0 motion vector.

In addition, a representative value (that is, a representative L1 motion vector which is derived based on L1 motion vectors) may be derived based on L1 motion vectors included in the temporary candidates, and the representative value may be derived as a L1 motion vector of B1. Specifically, the most probable vector in the L1 motion vectors included in the temporary candidates may be derived as the representative value, and an average value of the L1 motion vectors included in the temporary candidates may be derived as the representative value, and a median value of the L1 motion vectors included in the temporary candidates may be derived as the representative value.

In addition, a representative value of the L0 motion vectors included in candidates other than the current candidate among the temporary candidates (that is, a L0 motion vector which is derived based on L0 motion vectors) may be derived, and the representative value may be scaled in the L1 direction to derive a L1 motion vector of B1. Specifically, a representative value of the L0 motion vectors may be derived to be the most probable motion vector, an average value of the L0 motion vectors, or a median value of the L0 motion vectors, and the representative value may be scaled in the L1 direction to derive the L1 motion vector of B1.

According to the above-described method, bi-predicted candidates may be derived based on the uni-predicted candidates, that is, uni-predicted candidates including motion information of B1, B0, and T0 in Table 1. The pre-predicted candidates derived from among the temporary candidates may be replaced with the bi-predicted candidates, which correspond to the uni-predicted candidates, to derive a motion information candidate list of the current block. The motion information candidate list may be presented as shown in Table 2, as below.

TABLE 2

| Candidate index | Candidate block | pred_idc | refIdx(L0) | refIdx(L1) |
|---|---|---|---|---|
| 1 | A1 | Bi | 0 | 1 |
| 2 | B1 | Bi | 0 | 0 |
| 3 | B0 | Bi | 1 | 0 |
| 4 | A0 | Bi | 0 | 0 |
| 5 | T0 | Bi | 1 | 0 |

In this case, a candidate index is a motion information candidate index that indicates each candidate of each motion information candidate list. Motion information may include a motion vector and a reference picture index. In the above example, candidates having motion information candidate index values of 2, 3, and 5 correspond to candidates which are replaced with bi-predicted candidates.

In addition, candidates which include the derived bi-predicted candidates in addition to the temporary candidates may be derived as the motion information candidate list of the current block. The motion information candidate list may be presented as shown in Table 3, as below.

TABLE 3

| Candidate index | Candidate block | pred_idc | refIdx(L0) | refIdx(L1) |
|---|---|---|---|---|
| 1 | A1 | Bi | 0 | 1 |
| 2 | B1 | Uni | 0 | — |
| 3 | B0 | Uni | 1 | — |
| 4 | A0 | Bi | 0 | 0 |
| 5 | T0 | Uni | 1 | — |
| 6 | B1 | Bi | 0 | 0 |

TABLE 3-continued

| Candidate index | Candidate block | pred_idc | refIdx(L0) | refIdx(L1) |
|---|---|---|---|---|
| 7 | B0 | Bi | 1 | 0 |
| 8 | T0 | Bi | 1 | 0 |

In this case, there are presented bi-predicted candidates which further include candidates having motion information candidate index values 6, 7, and 8. The index order of the motion information candidates is exemplary and can be changed.

Meanwhile, the decoding device may derive a bi-predicted candidate (or bi-predicted motion information) using a unit-predicted candidate (or unit-predicted motion information), for example, through the following method. Hereinafter, description is provided based on the case where the uni-predicted candidate include L0 motion information (a L0 motion vector and/or a L0 reference picture index), and, in the case where the uni-predicted candidate includes L1 motion information (a L1 motion factor and/or a L1 reference picture index), the method may be implemented by changing only L0 and L1.

Figure 5:
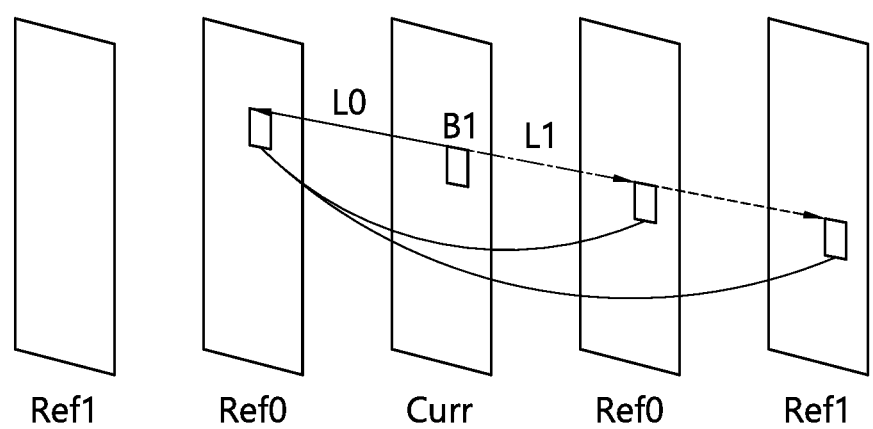
FIG. 5 shows an example of deriving a L1 reference picture by a decoding device.

FIG. 5 shows an example of deriving a L1 reference picture by a decoding device. Referring to FIG. 5, a uni-predicted candidate in the temporary candidates may be derived as a bi-predicted candidate, and a motion information candidate list of the current block including the bi-predicted candidate may be derived. This method may be applied as a method of derive the L1 reference picture index.

In addition, when a motion vector of a uni-predicted candidate, for example, the motion vector, is a L0 motion vector, the decoding device may derive a reference picture index of a reference picture list L1 indicating a reference picture including a reference block which has the smallest difference (that is, a sum of absolute difference (SAD)) between a reference block, which is derived based on the L0 motion vector and a L0 reference picture index associated with the L0 motion vector, and a reference block, which is indicated by the L0 motion vector derived as a result of scaling of the L0 motion vector in the L1 direction. In other words, it is possible to derive a reference picture on a reference picture list, in which a reference area indicated by the L0 motion vector and a reference area indicated by the L1 motion vector derived as a result of scaling of the L0 motion vector has the minimum difference(that is, residual) between samples due to phase.

Figure 6:
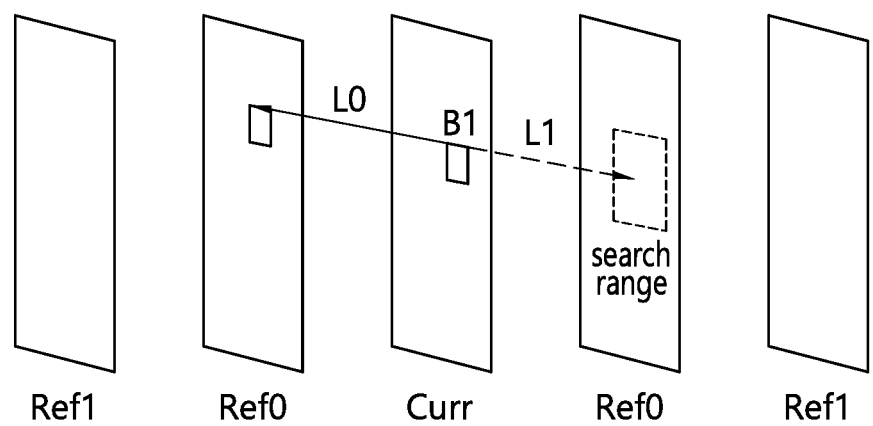
FIG. 6 shows an example of deriving a L1 motion vector By a decoding device.

FIG. 6 shows an example of deriving a L1 motion vector By a decoding device. In the case of deriving a bi-predicted candidate corresponding to a uni-predicted candidate, when a motion vector of the uni-predicted candidate is a L0 motion vector, a L1 motion vector may be derived via the above-described method.

In addition, via the above-described methods, the decoding device may derive L1 motion vector candidates, and derive a L1 motion vector candidate, which has the smallest residual between a reference area indicated by the L1 motion vector candidate and a reference area indicated by the L0 motion vector among the L1 motion vector candidates, as the L1 motion vector.

In addition, via the above-described methods, the decoding device may derive L1 motion vector candidates and derive a L1 reference picture index associated with a L1 motion vector based on the uni-predicted candidates so as to set a random search range on a reference picture indicated by the reference picture index. By performing a motion vector search based on the L1 motion vector candidates in the search range, the decoding device may derive a L1 motion vector candidate, which has the smallest residual with respect to a reference area indicated by the L0 motion vector, as the L1 motion vector.

In addition, the L1 motion vector may be generated by combining the above-described methods of deriving a L1 motion vector, and an exemplary deriving procedure is as follows.

When a motion vector of a uni-predicted candidate in temporary candidates, for example, the aforementioned motion vector, is a L0 motion vector, a L1 motion vector candidate may be derived by scaling the L0 motion vector in the L1 direction. In addition, the L1 motion vector candidate may be derived to be a representative value of L1 motion vectors of candidates other than the uni-predicted candidate among the temporary candidates. The L1 motion vector candidate may be derived by deriving a representative value of L0 motion vectors other than the uni-predicted candidate among the temporary candidates and scaling a motion vector having the representative value in the L1 direction. The L1 motion vector may be derived based on the L1 motion vector candidates. For example, a L1 motion vector candidate indicating a reference area which has the minimum residual with respect to a reference area indicated by the L0 motion vector among reference areas indicated the L1 motion vector candidates may be derived as the L1 motion vector. In addition, a random search range may be set on a reference picture indicated by a reference picture index associated with the L1 motion vector derived based on the uni-predicted candidate. By performing a motion vector search based on the L1 motion vector candidates in the search range, a L1 motion vector candidate having the smallest residual with respect to a reference area indicated by the L0 motion vector may be derived as the L1 motion vector.

When applying a modified inter prediction mode of the current mode via the above methods, an encoding device may generate a flag indicating whether the modified inter prediction mode is applied, and may transmit the flag to the decoding device. For example, the flag may be called a use new mode flag, a comb mode flat, etc. Alternatively, an existing merge flag may be replaced with inter mode type index information, and when a value of the inter mode type index information is 0, it may indicate the merge mode, and, when the value is 1, it indicates the AMVP mode, and, when the value is 2, it may indicate the modified inter prediction mode according to the present invention.

In addition, when a motion information candidate list is derived using the above-described methods, the encoding device may derive a specific candidate included in the motion information candidate list, and derive a motion vector of the current block based on the specific candidate. In addition, the encoding device may generate an index indicative of the specific candidate, and transmit the index to the decoding device. The decoding device may derive the motion information candidate list, derive the specific candidate by receiving the index indicative of the specific candidate, and derive the motion vector of the current block based on the specific candidate. The index may be called a new mode index, a motion vector index, or a MVP index. The use new mode flag and the new mode index may be transmitted using syntax as shown in Table 4, as below.

TABLE 4

| | Descriptor |
|---|---|
| prediction unit( x0, y0, nPbW, nPbH ) { | |
|   if( cu skip flag[ x0 ][ y0 ]) { | |
|     if( MaxNumMergeCand > 1 ) | |
|       merge idx[ x0 ][ y0 ] | ae(v) |
|   } else { /* MODE INTER */ | |
|     merge flag[ x0 ][ y0 ] | ae(v) |
|     if( merge flag[ x0 ][ y0 ]) { | |
|       if( MaxNumMergeCand > 1 ) | |
|         merge_idx[ x0 ][ y0 ] | ae(v) |
|     } else { | |
|       if( use_new_mode_flag[x0][y0] ) { | ae(v) |
|         if( MaxNumNewCand > 1 ) | — |
|         new_mode_idx[ x0 ][ y0 ] | ae(v) |
|       if( InterPredIdc [ x0 ][ y0 ] != PRED_L1 ) { | |
|         mvd_coding( x0, y0, 0 ) | |
|       } | |
|       if(InterPredIdc [ x0 ][ y0 ] != PRED_L0 ) { | |
|         if( mvd_l1_zero_flag && | |
|         InterPredIdc [ x0 ][ y0 ] = = | |
|         PRED_BI ) { | |
|         MvdL1[ x0 ][ y0 ][ 0 ] = 0 | |
|         MvdL1[ x0 ][ y0 ][ 1 ] = 0 | |
|       } else | |
|         mvd_coding( x0, y0, 1 ) | |
|     } | |
|   } else { | |

Referring to Table 4, a use_new_mode_flag syntax element may correspond to the new mode flag. In addition, a new_mode_idx syntax element may correspond to the new mode index. To reduce overhead of the new mode flag, the new mode flag may be selectively adapted according to a picture type, a CU size, and a depth. Specifically, the new mode flag may be encoded only when the picture type is B picture type, and the new mode flag may be encoded only when the CU size is smaller than 32×32.

Meanwhile, the decoding device may derive a specific candidate without receiving the new mode index. The decoding device may derive temporary candidates based on neighboring blocks, derive bi-predicted candidates corresponding to uni-predicted candidates in the temporary candidates, and derive a motion information candidate list including the bi-predicted candidates. The decoding device may derive a bi-predicted candidate, which has the minimum residual between a reference area indicated by a L0 motion vector on a L0 reference picture and a reference area indicated by a L1 motion vector on a L1 reference picture among the bi-predicted candidates of the motion information candidate list, as an MVP of the current block. In this case, the MVP may be derived during a decoding process, the encoding device may not transmit a index indicative of a specific candidate (the new mode index). The case where the new mode index is not transmitted may be presented in Table 5, as below.

TABLE 5

| | Descriptor |
|---|---|
| prediction unit( x0, y0, nPbW, nPbH ) { | |
|   if( cu skip flag[ x0 ][ y0 ] ) { | |
|     if( MaxNumMergeCand > 1 ) | |
|       merge idx[ x0 ][ y0 ] | ae(v) |
|   } else { /* MODE INTER */ | |
|     merge flag[ x0 ][ y0 ] | ae(v) |
|     if( merge flag[ x0 ][ y0 ] ) { | |
|       if( MaxNumMergeCand > 1 ) | |
|         merge_idx[ x0 ][ y0 ] | ae(v) |
|     } else { | |
|       if( use_new_mode_flag[x0][y0] ) { | ae(v) |

TABLE 5-continued

| | Descriptor |
|---|---|
| if( MaxNumNewCand > 1 ) | — |
|     new_mode_idx[ x0 ][ y0 ] | ae(v) |
| if( InterPredIdc [ x0 ][ y0 ] != PRED_L1) { | |
|   mvd_coding( x0, y0, 0 ) | |
| } | |
| if(InterPredIdc [ x0 ][ y0 ] != PRED_L0 ) { | |
|   if( mvd_l1_zero_flag && | |
|     InterPredIdc [ x0 ][ y0 ] = = PRED_BI ) { | |
|     MvdL1[ x0 ][ y0 ][ 0 ] = 0 | |
|     MvdL1[ x0 ][ y0 ][ 1 ] = 0 | |
|   } else | |
|     mvd_coding( x0, y0, 1 ) | |
| } | |
| } else { | |

Referring to Table 5, the new_mode_idx syntax element corresponds to the new mode index but is not transmitted.

Meanwhile, the above-described method of deriving a bi-predicted candidate based on a uni-predicted candidate describes only the case where L0 motion information is included in the uni-predicted candidate, but it is merely exemplary, and the method may be applied event to the case where L1 motion information is included in the uni-predicted candidate.

Figure 7:
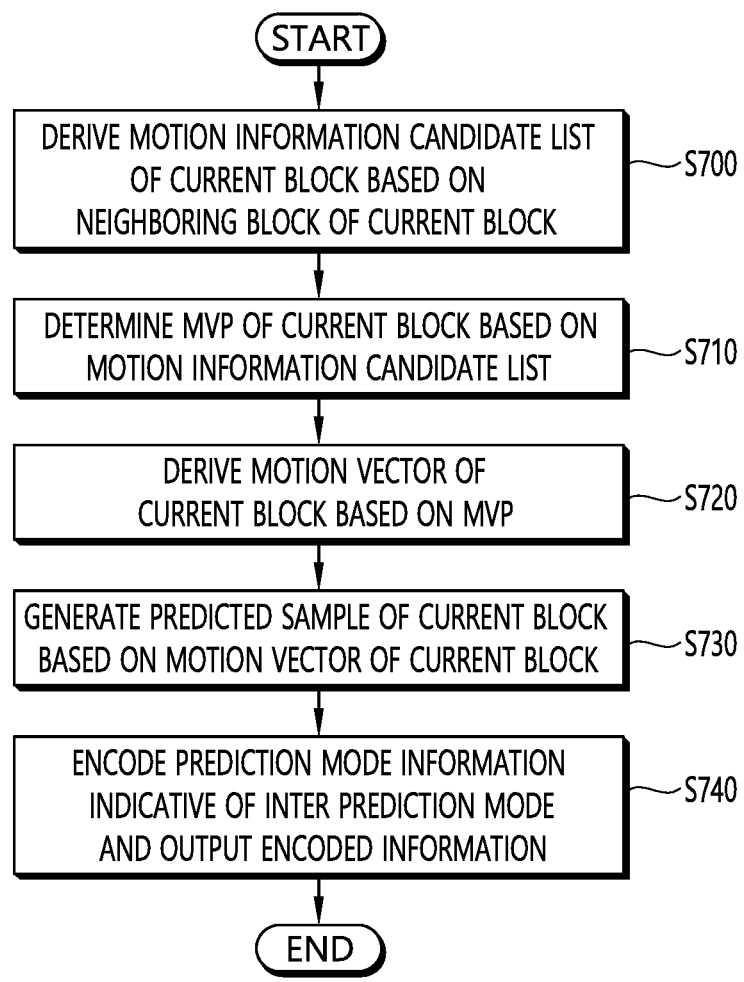
FIG. 7 schematically shows a video encoding method performed by an encoding device.

FIG. 7 schematically shows a video encoding method performed by an encoding device. The method shown in FIG. 7 may be performed by the encoding device shown in FIG. 1. For example, steps S700 to S730 may be performed by the predictor of the encoding device, and the step S740 may be performed by the entropy encoder of the encoding device.

The encoding device derives a motion information candidate list of the current block based on neighboring blocks of the current block in S700. The encoding device may derive temporary candidates based on the neighboring blocks. The temporary candidates may be bi-predicted candidates, or may be L0 or L1 prediction motion vector candidates. The L0 or L1 prediction motion vector candidates may be uni-predicted candidates. The uni-predicted candidates may be associated with a first motion vector, and the bi-predicted candidates may be associated with the first motion vector and a second motion vector. The first motion vector may include either a L0 motion vector or a L1 motion vector, and the bi-predicted candidates each may include both the L0 motion vector and the L1 motion vector. The L0 motion vector may indicate a motion vector regarding L0 prediction, and the L1 motion vector may indicate a motion vector regarding L1 prediction. L0 indicates a reference picture list L0 (list 0), and L1 indicates a reference picture list L1 (list 1). The L1 motion vector may have a direction opposite to a direction of the L0 motion vector.

The encoding device may derive bi-predicted candidates based on uni-predicted candidates in the temporary candidates. When the L0 motion vector corresponds to the first motion vector, the encoding device may derive the L1 motion vector included in the second motion vector, and a L1 reference picture index associated with the second motion vector.

In one example, the encoding device may set or fix the L1 reference picture index associated with the second motion vector to 1.

In another example, the L1 reference picture index associated with the second motion vector may be derived as a reference picture index that indicates a L1 reference picture which has a specific POC difference with respect to the current picture among reference pictures included in a reference picture list L1. The specific POC difference may be a value identical to a POC difference between the current picture and a L0 reference picture associated with the first motion vector among the reference pictures included in the reference picture list L0

In yet another example, the L1 reference picture index associated with the second motion vector may be derived to be a picture index having a value identical to the minimum value among values of the L1 reference picture index included in the temporary candidates.

In yet another example, the L1 reference picture index associated with the second motion vector may be derived to be a reference picture index having the most probable value among values of the L1 reference picture index included in the temporary candidates.

Meanwhile, the L1 motion vector included in the second motion vector may be derived by scaling the L0 motion vector in the L1 direction. In this case, the scaling may be performed using the above Equation 1.

In one example, the encoding device may derive the L1 motion vector by scaling the L0 motion vector based on a first difference and a second difference. The first difference indicates a difference between a picture order count (POC) of the current picture and a POC of a L0 reference picture associated with the L0 motion vector among reference pictures included in the reference picture list L0, and the second difference indicates a difference between a POC of the current picture and a POC of a L1 reference picture included in the reference picture list L1.

In yet another example, the L1 motion vector included in the second motion vector may be derived based on L1 motion vectors of other candidates among the temporary candidates. The encoding device may derive a representative value of the L1 motion vectors included in the temporary candidates, and derive the L1 motion vector based on the representative value. The representative value may be one of the following: the most probable vector among L1 motion vectors included in the temporary candidates; an average value of the L1 motion vectors included in the temporary candidates; and a median value of the L1 motion vectors included in the temporary candidates.

In yet another example, the L1 motion vector included in the second motion vector may be derived based on L0 motion vectors, except for the first motion vector, in the temporary candidates. The encoding device may derive the L1 motion vector by deriving a representative value of L0 motion vectors, except for the first motion vector, and scaling the representative value in the L1 direction. The representative value may be one of the following: the most probable motion vector among the L0 motion vectors except for the first motion vector; an average value of the L0 motion vectors included in the temporary candidates; and a median value of the L0 motion vectors included in the temporary candidates.

In yet another example, the encoding device may derive the L1 motion vector included in the second motion vector by combining the above-described deriving methods.

Meanwhile, for example, the encoding device may derive the motion information candidate list by replacing the uni-predicted candidates in the temporary candidates with the bi-predicted candidates corresponding to the uni-predicted candidates. In this case, the motion information candidate list may be as the same as the above Table 2.

In another example, the encoding device may derive the motion information candidate list by including the temporary candidates and additionally including the bi-predicted candidates corresponding to the uni-predicted candidates. In this case, the motion candidate list may be the same as the above Table 3.

Meanwhile, when the L1 motion vector corresponds to the first motion vector, the encoding device may derive the L0 motion vector included in the second motion vector and a reference picture index associated with the second motion vector.

For example, the encoding device may set or fix a L0 reference picture index associated with the second motion vector to 0.

In another example, a L0 reference picture index associated with the second motion vector may be derived to be a reference picture index that indicates L0 reference picture of which a POC difference with respect to the current picture among reference pictures included in a reference picture list L0 is a specific POC difference. The specific POC difference may be a value identical to a POC difference between the current picture and a L1 reference picture associated with the first motion vector among reference pictures included in the reference picture list L1.

In yet another example, the L0 reference picture index associated with the second motion vector may be derived to be a reference picture index having a value identical to the minimum value among values of the L0 reference picture indexes included in the temporary candidates.

In yet another example, the L0 reference picture index associated with the second motion vector may be derived to be a reference picture index having the most probable value among values of the L0 reference picture indexes included in the temporary candidates.

Meanwhile, the L0 motion vector included in the second motion vector may be derived by scaling the L1 motion vector in the L0 direction. In this case, the scaling may be performed using the above Equation 1.

In one example, the encoding device may derive the L0 motion vector by scaling the L1 motion vector based on a first difference and a second difference. The first difference indicates a difference between a POC of the current picture and a POC of a L1 reference picture associated with the L1 motion vector among reference pictures included in the reference picture list L1, and the second difference indicates a difference between a POC of a L0 reference picture included in the reference picture list L0 and a POC of the current picture.

In another example, the L0 motion vector included in the second motion vector may be derived based on L0 motion vectors of other candidates among the temporary candidates. The encoding device may derive a representative value of the L0 motion vectors included in the temporary candidates, and derive the L0 motion vector based on the representative value. The representative value may be one of the following: the most probable motion vector among the L0 motion vectors included in the temporary candidates; an average value of the L0 motion vectors included in the temporary candidates; and a median value of the L0 motion vectors included in the temporary candidates.

In addition, the L0 motion vector included in the second motion vector may be derived based on L1 motion vectors, except for the first motion vector, in the temporary candidates. The encoding device may derive the L0 motion vector by deriving a representative value of the L1 motion vectors except for the first motion vector and scaling the representative value in the L0 direction. The representative value may be one of the following: the most probable motion vector among the L1 motion vectors except for the first motion vector; an average value of the L1 motion vectors included in the temporary candidates; and a median value of the L1 motion vectors included in the temporary candidates.

In another example, the encoding device may derive the L0 motion vector included in the second motion vector by combining the above-described deriving methods.

Meanwhile, in one example, the encoding device may derive the motion information candidate list by replacing the uni-predicted candidates in the temporary candidates with the bi-predicted candidates corresponding to the uni-predicted candidates.

In another example, the encoding device may derive the motion information candidate list by including the temporary candidates and additionally including the bi-predicted candidates corresponding to the uni-predicted candidates.

The encoding device determines a motion vector predictor (MVP) of the current block based on the motion information candidate list in S710. The encoding device may derive the MVP by selecting one candidate from the motion information candidate list of the current block. The encoding device may generate index information indicating the selected candidate. The index information may be called a new mode index, a motion vector index, or a MVP index.

The encoding device derives a motion vector of the current block based on the MVP in S720. The encoding device may derive the motion vector based on the MVP, and calculate a motion vector difference (MVD) of the current block based on a difference between the motion vector and the MVP.

The encoding device generates a predicted sample of the current block based on the motion vector in S730. The encoding device may acquire a predicted sample value on a reference picture indicated by the motion vector, and generate the predicted sample.

The encoding device may encode and output prediction mode information indicating the inter prediction mode in S1340. The encoding device may entropy encode the prediction mode information, which indicates a modified inter prediction mode in which a motion vector of the current block is derived based on the motion information candidate list derived based on the neighboring blocks, and may output the entropy-encoded prediction mode information in the form of a bit stream. In addition, the encoding device may generate and encode a flag indicating whether the modified inter prediction mode is applied, and may output the flag in the form of a bit stream. For example, the flag may be called a use new mode flag, a comb mode flag, etc. Alternatively, an existing merge flag may be replaced with inter mode type index information, and, when a value of inter mode type index information is 0, it may indicate the merge mode, and, when the value is 1, it may indicate the AMVP mode, and when the value is 2, it may indicate the modified inter prediction mode according to the present invention.

In addition, the encoding device may generate and encode a new mode index indicating candidates included in the motion information candidate list, and output the new mode index in the form of a bit stream. In addition, the encoding device may encode a MVD of the current block to transmit information on the MVD. The prediction mode information, the new mode index, and the MVD may be transmitted to the decoding device in the form of a bit stream. The bit stream may be transmitted to the decoding device via a network or a storage medium.

Although not illustrated in the drawings, the encoding device may encode and output information on a residual sample of the current block. The information on the residual sample may include a transform coefficient regarding the residual sample.

Figure 8:
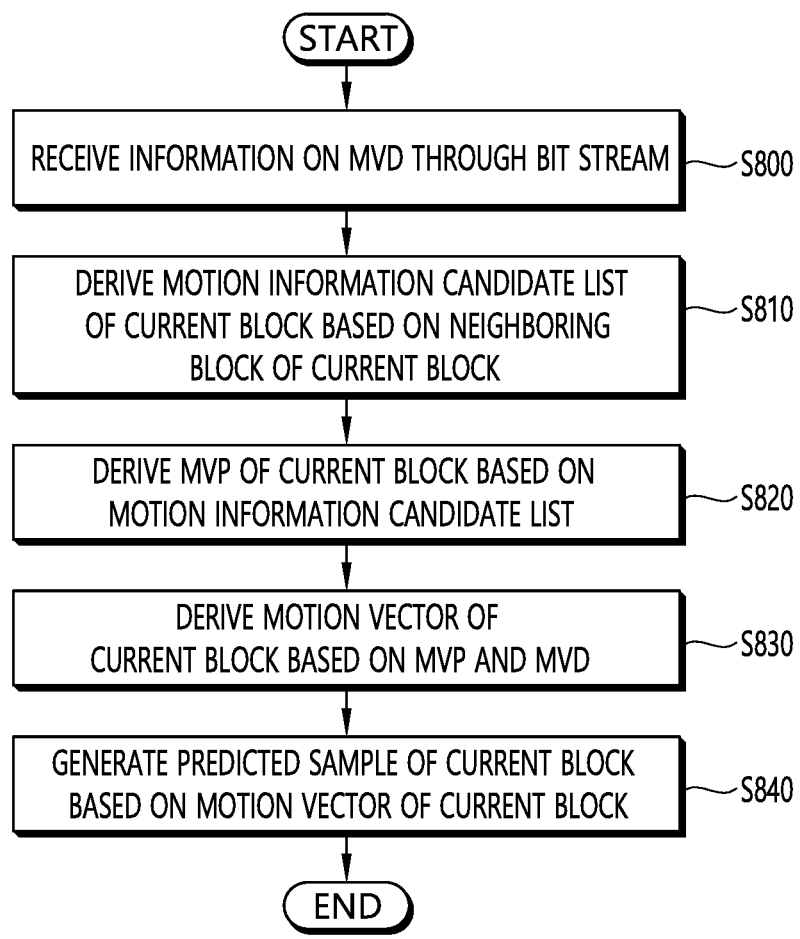
FIG. 8 schematically illustrates a video decoding method performed by a decoding apparatus according to the present invention.

FIG. 8 schematically illustrates a video decoding method performed by a decoding apparatus according to the present invention. The method shown in FIG. 8 may be performed by the decoding device shown in FIG. 8. Specifically, for example, the step S800 in FIG. 8 may be performed by the entropy decoder of the encoding device, and the steps S810 to S840 may be performed by the predictor of the decoding device.

The decoding device receives a motion vector difference (MVD) through a bit stream in S800. Information on the MVD may be received through a bit stream. The decoding device may receive the information on the MVD through entropy decoding. In this case the decoding device may receive information on an X-axis component of the MVD and information on a Y-axis component of the MVD through different syntax elements.

The decoding device may derive a motion information candidate list based on neighboring blocks of the current block in S810. The decoding device may derive temporary candidates based on the neighboring blocks. The temporary candidates may be bi-predicted candidates or may be L0 or L1 prediction motion vector candidates. The L0 or L1 prediction motion vector candidates each may be a uni-predicted candidate. The un-predicted candidates may be associated with a first motion vector, and the bi-predicted candidates may be associated with the first motion vector and a second motion vector. The first motion vector may include either a L0 motion vector or a L1 motion vector, and the bi-predicted candidate each may include both the L0 motion vector and the L1 motion vector. The L0 motion vector indicates a motion vector regarding L0 prediction, and the L1 motion vector indicates a motion vector regarding L1 prediction. L0 indicates a reference picture list L0 (list 0), and L1 indicates a reference picture list (list 1). The L1 motion vector may have a direction opposite to a direction of the L0 motion vector.

The decoding device may derive bi-predicted candidates based on uni-predicted candidates among the temporary candidates. When the L0 motion vector corresponds to the first motion vector, the decoding device may derive the L1 motion vector included in the second motion vector, and a L1 reference picture index associated with the second motion vector.

In one example, the decoding device may set or fix the L1 reference picture index associated with the second motion vector to 0.

In another example, the L1 reference picture index associated with the second motion vector may be derived to be a reference picture index that indicates a L1 reference picture having a specific POC difference with respect to the current picture. The specific POC difference may be a value identical to a POC difference between the current picture and a L0 reference picture associated with the first motion vector among reference pictures included in the reference picture list L0.

In yet another example, the L1 reference picture index associated with the second motion vector may be derived to be a reference picture index having a value identical to the minimum value among values of the L1 reference picture indexes included in the temporary candidates.

In yet another example, the L1 reference picture index associated with the second motion vector may be derived to be a reference picture index having the most probable value among values of L1 reference picture indexes included in the temporary candidates.

In yet another example, the L1 reference picture index associated with the second motion vector may be derived to be a reference picture index indicating a L1 reference picture which has the minimum residual between a reference area indicated by the second motion vector among all reference pictures included in the reference picture list L1 and a reference area indicated by the first motion vector.

Meanwhile, the L1 motion vector included in the second motion vector may be derived by scaling the L0 motion vector in the L1 direction. In this case, the scaling may be performed using the above Equation 1.

In one example, the decoding device may derive the L1 motion vector by scaling the L0 motion vector based on a first difference and a second difference. The first difference indicates a difference between a POC of the current picture and a POC of a L0 reference picture associated with the L0 motion vector among reference pictures included in the reference picture list L0, and the second difference indicates a difference between a POC of a reference picture included in the reference picture list L1 and a POC of the current picture.

In yet another example, the L1 motion vector included in the second motion vector may be derived based on L1 motion vectors of other candidates among the temporary candidates. The decoding device may derive a representative value of L1 motion vectors included in the temporary candidates and derive the L1 motion vector based on the representative value. The representative value may be one of the following: the most probable motion vector among the L1 motion vectors included in the temporary candidates; an average value of the L1 motion vectors included in the temporary candidates; and a median value of the L1 motion vectors included in the temporary candidates.

For example, the L1 motion vector included in the second motion vector may be derived based on L0 motion vectors, except for the first motion vector, among the temporary candidates. The decoding device may derive the L1 motion vector by deriving a representative value of the L0 motion vectors except for the first motion vector and scaling the representative value in the L1 direction. The representative value may be one of the following: the most probable motion vector among the L0 motion vectors except for the first motion vector; an average value of the L0 motion vectors included in the temporary candidates; and a median value of the L0 motion vectors included in the temporary candidates.

In another example, the decoding device may derive the L1 motion vector included in the second motion vector by combining the above-described deriving methods. In this case, the decoding device may derive L1 motion vectors using the above-described deriving methods, and derive the L1 motion vector, indicating a reference area which has the minimum residual with respect to a reference area indicated by the first motion vector among the L1 motion vectors, as the second motion vector. In addition, the decoding device may derive L1 motion vectors using the above-described deriving methods, and set a random search range for a reference picture indicated by the L1 reference picture index associated with the second motion vector. Next, by performing a motion search in the search range of the L1 motion vectors, the decoding device may derive a L1 motion vector, indicating a reference area which has the minimum residual with respect to a reference area indicated by the first motion vector, as the second motion vector.

Meanwhile, in one example, the decoding device may derive the motion information candidate list by replacing the uni-predicted candidates in the temporary candidates with the bi-predicted candidates corresponding to the uni-predicted candidates. In this case, the motion information candidate list may be the same as the above Table 2.

In another example, the decoding device may derive the motion information list by including the temporary candidates and additionally including the bi-predicted candidates corresponding to the uni-predicted candidates. In this case, the motion information candidate list may be the same as the above Table 3.

Meanwhile, when the L1 motion vector corresponds to the first motion vector, the decoding device may derive the L0 motion vector included in the second motion vector and a reference picture index associated with the second motion vector.

For example, the decoding device may set or fix the L0 reference picture index associated with the second motion vector to 0.

In another example, the reference picture index associated with the second motion vector may be derived as a reference picture index which indicates a L1 reference picture of which a POC difference with respect to the current POC is a specific POC among reference pictures included in the reference picture list L0. The specific POC difference may be a value identical to a POC value of an L1 reference picture associated with the first motion vector among reference pictures included in the reference picture list L1.

In yet another example the L0 reference picture index associated with the second motion vector may be derived as a reference picture index having a value identical to the minimum value among values of the L0 reference indexes included in the temporary candidates.

In yet another example, the L0 reference picture index associated with the second motion vector may be derived as a reference picture index having the most probable value among values of the L0 reference picture indexes included in the temporary candidates.

In yet another example, the L0 reference picture index associated with the second motion vector may be derived as a reference picture index indicating a L1 reference picture which has the minimum residual between a reference area indicated by the second motion vector and a reference area indicated by the first motion vector among all reference pictures included in the reference picture list L0.

Meanwhile, the L0 motion vector included in the second motion vector may be derived by scaling the L1 motion vector in the L0 direction. In this case, the scaling may be performed using the above Equation 1.

In one example, the decoding device may derive the L0 motion vector by scaling the L1 motion vector based on a first difference and a second difference. The first difference indicates a difference between a picture order count (POC) of the current picture and a POC of a L1 reference picture associated with the L1 motion vector among reference pictures included in the reference picture list L1, and the second difference indicates a difference between a POC of the current picture and a POC of a L0 reference picture included in the reference picture list L0.

In yet another example, the L0 motion vector included in the second motion vector may be derived based on L0 motion vectors of other candidates among the temporary candidates. The encoding device may derive a representative value of the L0 motion vectors included in the temporary candidates, and derive the L0 motion vector based on the representative value. The representative value may be one of the following: the most probable vector among L0 motion vectors included in the temporary candidates; an average value of the L0 motion vectors included in the temporary candidates; and a median value of the L0 motion vectors included in the temporary candidates.

In yet another example, the L0 motion vector included in the second motion vector may be derived based on L1 motion vectors, except for the first motion vector, in the temporary candidates. The encoding device may derive the L0 motion vector by deriving a representative value of L1 motion vectors, except for the first motion vector, and scaling the representative value in the L0 direction. The representative value may be one of the following: the most probable motion vector among the L1 motion vectors except for the first motion vector; an average value of the L1 motion vectors included in the temporary candidates; and a median value of the L1 motion vectors included in the temporary candidates.

In another example, the decoding device may derive the L0 motion vector included in the second motion vector by combining the above-described deriving methods. In this case, the decoding device may derive L0 motion vectors using the above-described deriving methods, and derive the L0 motion vector, indicating a reference area which has the minimum residual with respect to a reference area indicated by the first motion vector among the L0 motion vectors, as the second motion vector. In addition, the decoding device may derive L0 motion vectors using the above-described deriving methods, and set a random search range for a reference picture indicated by the L0 reference picture index associated with the second motion vector. Next, by performing a motion search within the search range of the L0 motion vectors, the decoding device may derive a L0 motion vector, indicating a reference area which the minimum residual with respect to a reference area indicated by the first motion vector, as the second motion vector.

Meanwhile, in one example, the decoding device may derive the motion information candidate list by replacing the uni-predicted candidates in the temporary candidates with the bi-predicted candidates corresponding to the uni-predicted candidates.

In another example, the decoding device may derive the motion information list by including the temporary candidates and additionally including the bi-predicted candidates corresponding to the uni-predicted candidates.

The decoding device derives an MVP of the current block based on the motion information candidate list in S820. The decoding device may acquire index information, which indicates a specific candidate from the motion information candidate list, through a bit stream. The index information may be called a new mode index, a motion vector index, or an MVP index. The decoding device may derive an MVP of the current block based on the specific candidate indicated by the new mode index. The MVP may be either a bi-predicted candidate or a uni-predicted candidate.

Meanwhile, the decoding device may derive an MVP of the current block based on the motion information candidate list without receiving the new mode index. The decoding device may derive the MVP based on a bi-predicted motion information candidate, which has the minimum residual between a first reference area indicated by a L0 motion vector on a L0 reference picture and a second reference area indicated by a L1 direction motion vector on a L1 reference picture among bi-predicted candidates included in the motion information candidate list.

The decoding device derives a motion vector of the current block based on the MVP and an MVD in S830. The decoding device may generate a motion vector of the current block by adding the MVP and the MVD.

The decoding device generates a predicted sample of the current block based on the motion vector of the current block in S840. The decoding device may acquire a predicted sample value on a reference picture indicated by the motion vector, and generate the predicted sample.

The decoding device may generate a reconstructed sample of the current sample based on the predicted value. The decoding device may acquire a residual signal from a bit stream received from the encoding device, and generate a residual sample for the current sample. In this case, the decoding device may generate the reconstructed sample based on the predicted sample and the residual sample. The decoding device may generate a reconstructed picture based on the reconstructed sample.

According to the above description of the present invention, it is possible to derive a motion vector based on a motion information candidate list derived based on neighboring blocks, thereby reducing an amount of data of predicted mode information indicative of an inter prediction mode and improving overall coding efficiency.

In addition, according to the present invention, various methods for deriving bi-predicted candidates to derive a motion vector is provided, thereby enabling more accurate inter prediction and improving overall coding efficiency.

In the above-described embodiments, methods are described on the basis of a flowchart using a series of steps or blocks, but the present invention is not limited to the sequence of steps. Some steps may occur simultaneously or in a different sequence than the steps described above. Further, those skilled in the art will understand that the steps illustrated in the sequence diagram are not exclusive, that other steps may be included, or that one or more steps in the flowchart may be deleted without affecting the scope of the present invention.

The method according to the present invention described above may be implemented in software. The encoding device and/or decoding device according to the present invention may be included in a device that performs image processing, for example, for a TV, a computer, a smart phone, a set-top box, or a display device.

When the embodiments of the present invention are implemented in software, the above-described method may be implemented by modules (processes, functions, and so on) that perform the functions described above. Such modules may be stored in memory and executed by a processor. The memory may be internal or external to the processor, and the memory may be coupled to the processor using various well known means. The processor may comprise an application-specific integrated circuit (ASIC), other chipsets, a logic circuit and/or a data processing device. The memory may include a ROM (read-only memory), a RAM (random access memory), a flash memory, a memory card, a storage medium, and/or other storage device.

What is claimed is:

1. An inter prediction method performed by a decoding apparatus, the method comprising:
  receiving information on a motion vector difference (MVD) through a bit-stream;
  constructing a motion vector predictor (MVP) candidate list based on neighboring blocks of a current block;
  deriving a MVP of the current block based on the MVP candidate list;
  deriving a motion vector of the current block based on the MVP and the MVD; and
  generating a predicted sample with respect to the current block based on the motion vector,
  wherein constructing the MVP candidate list comprises:
    deriving temporary MVP candidates based on the neighboring blocks;
    for a temporary MVP candidate which is an uni-predicted candidate, deriving a bi-predicted candidate by using the uni-predicted candidate, wherein the uni-predicted candidate includes one of a L0 motion vector or a L1 motion vector, and the bi-predicted candidate includes both of the L0 motion vector and the L1 motion vector; and
    constructing the MVP candidate list of the current block including the bi-predicted candidate,
  wherein Sum of Absolute Differences (SAD) between a L0 reference block for a MVP L0 motion vector for the MVP and a L1 reference block for a MVP L1 motion vector for the MVP is smaller than SAD between a L0 reference block for a non-MVP L0 motion vector for one of the temporary MVP candidates except the MVP and a L1 reference block for a non-MVP L1 motion vector for one of the temporary MVP candidates except the MVP,
  wherein the MVP candidate list is constructed by replacing the uni-predicted candidate among the temporary MVP candidates with the bi-predicted candidate, and
  wherein the number of the temporary MVP candidates is same with the number of all MVP candidates of the constructed MVP candidates list after the replacing.

2. The method of claim 1, wherein the L1 motion vector has a direction opposite to a direction of the L0 motion vector.

3. The method of claim 1, wherein, when the uni-predicted candidate includes the L0 motion vector, the L1 motion vector is derived by scaling the L0 motion vector.

4. The method of claim 3,
  wherein the L1 motion vector is derived by scaling the L0 motion vector based on a first difference and a second difference,
  wherein the first difference represents a difference between a picture order count (POC) of a current picture and a POC of a L0 reference picture associated with the L0 motion vector among reference pictures included in a reference picture list L0, and
  wherein the second difference represents a difference between a POC of a L1 reference picture included in a reference picture list L1 and the POC of the current picture.

5. The method of claim 1,
  wherein when the uni-predicted candidate includes the L0 motion vector, a L1 reference picture index associated with the L1 motion vector indicates a L1 reference picture of which POC difference with respect to a current picture is a specific POC difference among reference pictures included in a reference picture list L1, and
  wherein the specific POC difference is identical to a POC difference between the POC of the current picture and a POC of a L0 reference picture associated with the L0 motion vector among reference pictures included in the reference picture list L0.

6. The method of claim 1, wherein when the uni-predicted candidate includes the L0 motion vector, a value of a L1 reference picture index associated with the L1 motion vector is derived to be a value identical to a minimum value among values of L1 reference picture indexes for the temporary MVP candidates.

7. The method of claim 1, wherein, when the uni-predicted candidate includes the L0 motion vector, a value of a L1 reference picture index associated with the L1 motion vector is derived to be a most probable value among values of L1 reference picture indexes for the temporary MVP candidates.

8. The method of claim 1,
wherein a value of a reference picture index associated with the L1 motion vector for the bi-predicted candidate indicates a second reference picture,
wherein the L1 motion vector for the bi-predicted candidate is derived by scaling the L0 motion vector for the bi-predicted candidate to an opposite direction with a direction of the L0 motion vector for the bi-predicted candidate based on the second reference picture,
wherein SAD between a first reference area indicated by the L0 motion vector for the bi-predicted candidate on a first reference picture and a second reference area indicated by the L1 motion vector for the bi-predicted candidate on the second reference picture is smaller than SAD between the first reference area and a third reference area on a third reference picture indicated by a L1-direction motion vector,
wherein the third reference picture is not equal to the second reference picture, and
wherein the L1-direction motion vector is derived by scaling the L0 motion vector for the bi-predicted candidate to the opposite direction with the direction of the L0 motion vector for the bi-predicted candidate.

9. The method of claim 1, wherein, when the uni-predicted candidate includes the L0 motion vector, a L1 motion vector is derived based on L1 motion vectors included in the temporary MVP candidates.

10. The method of claim 1, wherein, when the uni-predicted candidate includes the L0 motion vector, a L1 motion vector is derived by scaling a L0 motion vector, which is derived based on L0 motion vectors except for the L0 motion vector in the uni-predicted candidate from the temporary MVP candidates, in a L1 direction.

11. An inter prediction method performed by an encoding device, the method comprising:
deriving a motion vector predictor (MVP) candidate list based on neighboring blocks of a current block;
determining a MVP of the current block based on the MVP candidate list;
deriving a motion vector difference (MVD) of the current block based on the MVP; and
encoding video information including information on the MVD,
wherein constructing the MVP candidate list comprising:
deriving temporary MVP candidates based on the neighboring blocks;
for a temporary MVP candidate which is an uni-predicted candidate, deriving a bi-predicted candidate by using the uni-predicted candidate, wherein the uni-predicted candidate includes one of a L0 motion vector or a L1 motion vector, and the bi-predicted candidate includes both of the L0 motion vector and the L1 motion vector; and
constructing the MVP candidate list of the current block including the bi-predicted candidate,
wherein Sum of Absolute Differences (SAD) between a L0 reference block for a MVP L0 motion vector for the MVP and a L1 reference block for a MVP L1 motion vector for the MVP is smaller than SAD between a L0 reference block for a non-MVP L0 motion vector for one of the temporary MVP candidates except the MVP and a L1 reference block for a non-MVP L1 motion vector for one of the temporary MVP candidates except the MVP,
wherein the MVP candidate list is constructed by replacing the uni-predicted candidate among the temporary MVP candidates with the bi-predicted candidate, and
wherein the number of the temporary MVP candidates is same with the number of all MVP candidates of the constructed MVP candidates list after the replacing.

* * * * *